United States Patent
Stark et al.

(10) Patent No.: US 8,345,707 B2
(45) Date of Patent: Jan. 1, 2013

(54) METHOD FOR SYNCHRONIZING DATA MAINTAINED AT A PLURALITY OF NODES

(75) Inventors: Jonathan K. Stark, San Jose, CA (US); Matthew J. Ranney, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 497 days.

(21) Appl. No.: 12/710,264

(22) Filed: Feb. 22, 2010

(65) Prior Publication Data

US 2010/0309933 A1    Dec. 9, 2010

Related U.S. Application Data

(60) Provisional application No. 61/183,738, filed on Jun. 3, 2009.

(51) Int. Cl.
*H04J 3/00* (2006.01)
(52) U.S. Cl. ........................................ 370/464; 707/610
(58) Field of Classification Search .................. None
See application file for complete search history.

(56) References Cited

U.S. PATENT DOCUMENTS

| | | | | |
|---|---|---|---|---|
| 5,970,502 A | * | 10/1999 | Salkewicz et al. | 707/999.202 |
| 2002/0059465 A1 | * | 5/2002 | Kim | 709/248 |
| 2003/0088577 A1 | * | 5/2003 | Thurnhofer et al. | 707/103 Y |
| 2009/0144632 A1 | * | 6/2009 | Mendez | 715/738 |
| 2010/0223432 A1 | * | 9/2010 | Eidus et al. | 711/148 |

\* cited by examiner

*Primary Examiner* — Kevin C Harper
(74) *Attorney, Agent, or Firm* — Beyer Law Group LLP

(57) ABSTRACT

A method for synchronizing data maintained at a plurality of data objects. The method involves assembling source and destination trees, each of the source and destination trees including a root node and one or more dependent nodes associated with source and destination data maintained at the plurality of data objects respectively. After the trees are assembled, a checksum calculation is performed for the nodes of the source tree and the destination tree based on the associated source data and the associated destination data maintained at the plurality of data objects respectively. The destination tree and the destination data are synchronized with the source tree and source data based on the comparison of the checksum calculations of corresponding nodes in the source tree and the destination tree. Missing nodes or nodes having mismatching checksums in the destination tree are identified and either added or modified to match the corresponding node or nodes in the source tree, while the data in the source data objects are fetched and copied by the destination data object corresponding to the added and/or modified nodes in the destination tree.

56 Claims, 14 Drawing Sheets

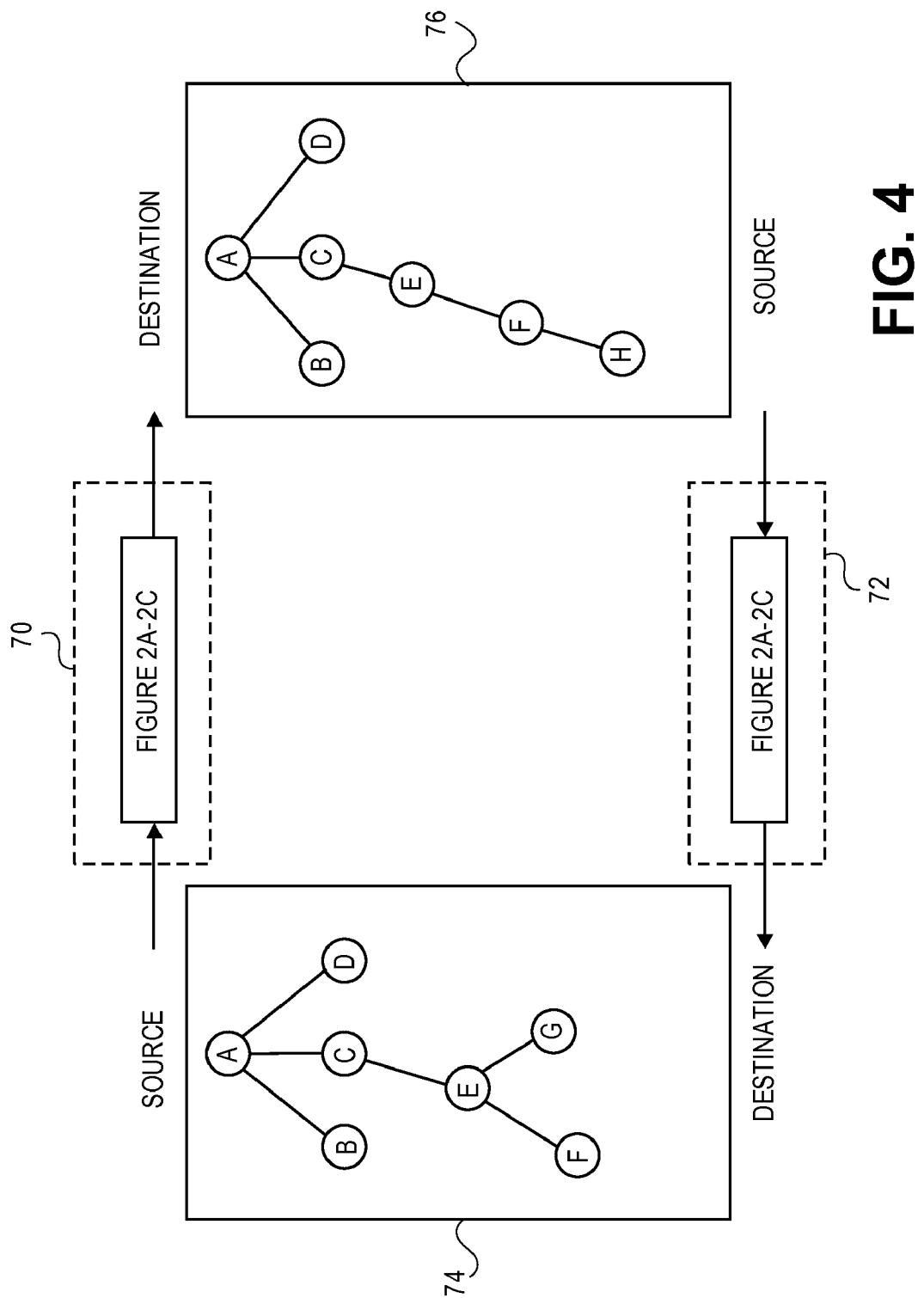

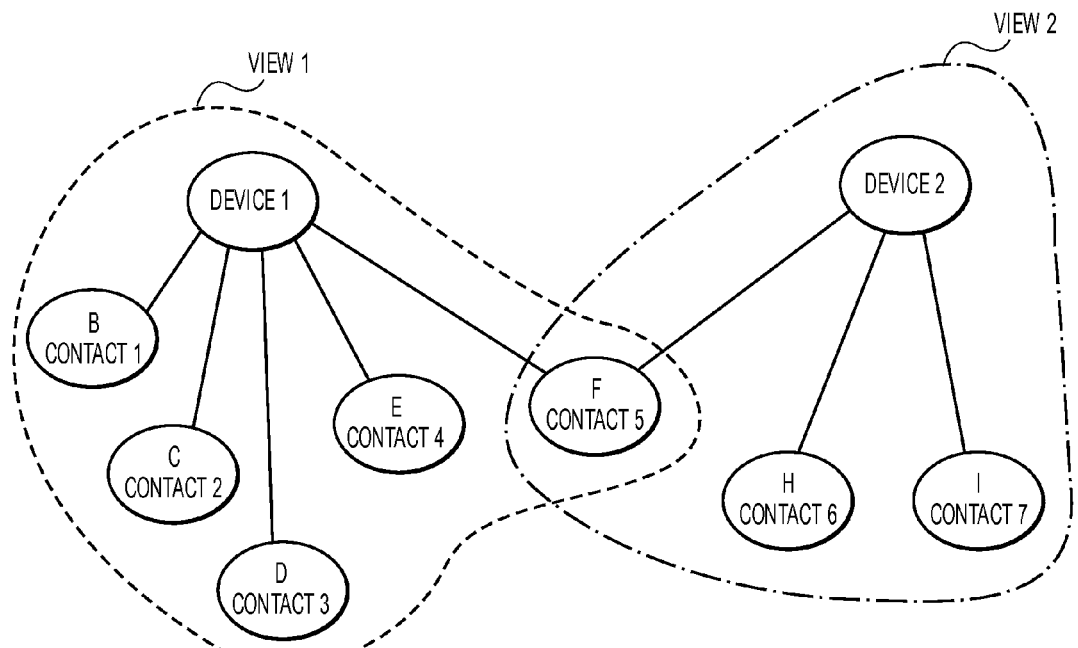
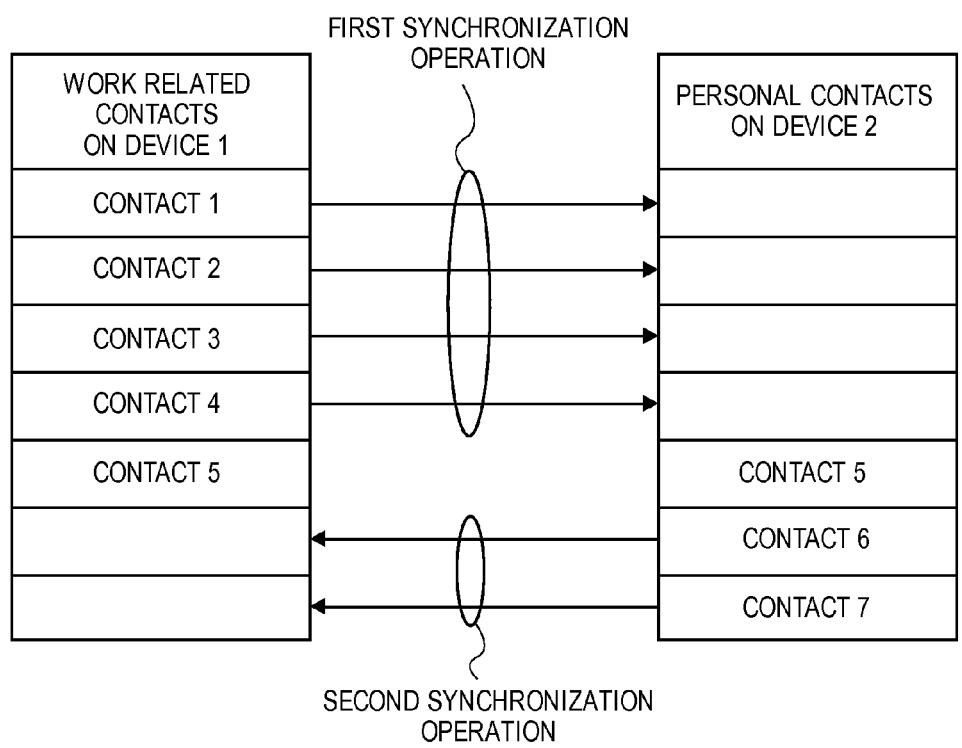
FIG. 5A

User Table

| User Table | User ID | Special |
|---|---|---|
| John Doe | 1 | No |
| Jane Doe | 2 | Yes |
| Jim Bob | 3 | Yes |

Message List by Year Table

| Year | User ID | Message List |
|---|---|---|
| 2004 | 1 | 1,2,3,4,5 |
| 2005 | 1 | 6,7,8,9,10 |
| 2006 | 1 | 11,12,13 |
| 2007 | 1 | 34 |
| 2008 | 1 | 14,15,16 |
| 2009 | 1 | 123, 345, 1231 |
| 2009 | 3 | 26, 26, 27 |

FIG. 6A

METHOD FOR SYNCHRONIZING DATA MAINTAINED AT A PLURALITY OF NODES

CROSS-REFERENCE TO RELATED APPLICATIONS

This application claims the benefit of priority to U.S. Provisional Patent Application No. 61/183,738, filed on Jun. 3, 2009, entitled "Methods For Synchronizing Data Maintained at a Plurality of Nodes", incorporated herein by reference in its entirety for all purposes.

BACKGROUND

1. Field of the Invention

This invention relates to data synchronization, and more particularly, to defining views of source and destination data to be synchronized, assembling source and destination trees, including one or more nodes, representative of the source and destination data to be synchronized respectively, calculating and comparing a checksum value for each of the nodes in the source and destination trees, and synchronizing the destination data corresponding to the destination nodes in the destination tree having checksums that do not match the corresponding nodes in the source tree respectively.

2. Description of Related Art

A checksum is typically computed for the purpose of detecting errors or data corruption that may occur during the storage or transmission of digital data. Typically the checksum is calculated before the data is transmitted or stored. By re-computing the checksum at the receiving or storage device, the integrity of the data as transmitted or stored may be checked. If the checksums match, it is assumed that the data had not been altered in transmission or storage. On the other hand if the two checksums are different, then it is assumed that an error or some other corruption occurred during the transmission and/or storage process.

A number of checksum procedures or algorithms are known. Examples include parity checksums, modular checksums, and position-dependent checksums. With parity checksums, the data is broken down into words with a fixed number of "n" bits per word. For all the words, a logical operation is performed. The operation result is then appended to the transmitted or stored message as an extra word. To check the integrity of the message, the receiver computes the same logical operation on all the words of the original message. If the checksum result is the same, then it is assumed no error occurred. If the checksum result, however, is different, then the receiver assumes that an error occurred. Modular sum algorithms are a variant of parity checksums with the addition of adding all the "words" of the original message as unsigned binary numbers, discarding any overflow bits, and appending the two's complement of the total as the checksum. To validate a message, the receiver adds all the words of the original message in the same manner. If the result is not a word including all logical zeros, an error is assumed to have occurred. With position-dependent checksums, not only are transmission or storage errors detected, but the bit-position of the error is determined as well. The most common position-dependent checksums include cyclical redundancy checks (CRCs), Fletcher's checksum and Adler-32.

SUMMARY OF THE INVENTION

A method for synchronizing data maintained at a plurality of data objects. The method involves assembling source and destination trees, each of the source and destination trees including a root node and one or more dependent nodes associated with source and destination data maintained at the plurality of data objects respectively. After the trees are assembled, a checksum calculation is performed for the nodes of the source tree and the destination tree based on the associated source data and the associated destination data maintained at the plurality of data objects respectively. The destination tree and the destination data are synchronized with the source tree and source data based on the comparison of the checksum calculations of corresponding nodes in the source tree and the destination tree. Missing nodes or nodes having mismatching checksums in the destination tree are identified and either added or modified to match the corresponding node or nodes in the source tree, while the data in the source data objects are fetched and copied by the destination data object corresponding to the added and/or modified nodes in the destination tree.

BRIEF DESCRIPTION OF THE DRAWINGS

The invention may best be understood by reference to the following description taken in conjunction with the accompanying drawings, which illustrate specific embodiments of the invention.

FIG. 4 is a diagram illustrating bidirectional synchronization between two trees according to the present invention.

FIGS. 5A and 5B are diagrams illustrating source and destination trees and storage devices after a bidirectional synchronization according to the present invention.

FIGS. 6A-6E are diagrams of data contained in data object tables and various trees defining multiple views of the data according to the present invention.

It should be noted that like reference numbers refer to like elements in the figures.

DETAILED DESCRIPTION OF SPECIFIC EMBODIMENTS

Figure 1:
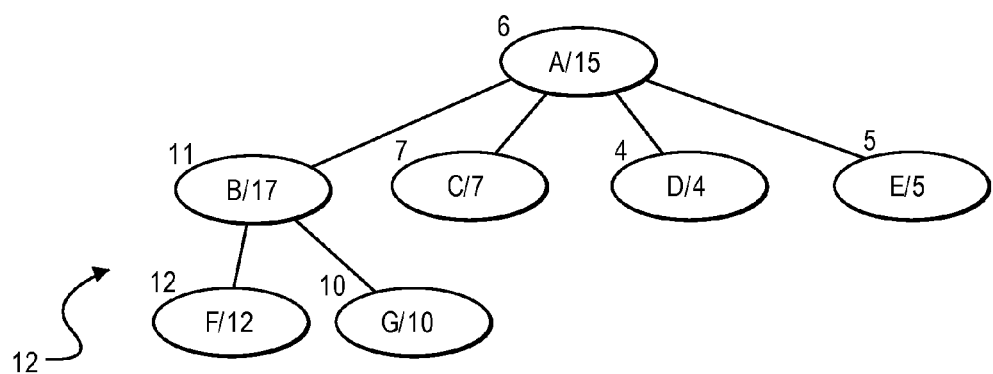
FIG. 1 is a diagram illustrating a tree of nodes and storage locations according to the present invention.

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

A data object is an allocated location of storage for storing data. Data objects may be maintained in a variety of computing and communication type devices. For example, data objects may be maintained in a computer, within a database, at various locations across a computer network, or in a communication device. For a variety of reasons, it may be desirable to synchronize the data maintained by different data objects, whether the data objects are maintained on the same or different computers, communication devices, databases, etc.

The data in the data objects maintained at the different locations may be organized into structured views using an algorithm that segments the data into one or more nodes. Once a view has been defined, a tree representation of the view, including the one or more nodes, each associated with a data object, is assembled.

The synchronization protocol involves defining the two views of source and destination data using the identical algorithm. Once the two views have been defined, source and destination tree representations of the two views are assembled. Each tree includes one or more nodes associated with the source and destination data stored at the various data objects to be synchronized respectively. For each node in the source and destination trees, data and node checksum values are then calculated based on the data in the data object associated with each node and any dependent nodes respectively.

During the synchronization process, the two trees are traversed. During the traversal process, the checksum values of corresponding nodes are compared. Missing or nodes with mismatching checksum values are identified in the destination tree. For mismatching nodes, the data in the associated source object is fetched and copied into the corresponding destination object. For missing nodes, a corresponding node is added to the destination tree and a data object is created. The data of the associated source object is then copied into the created destination object. When all the nodes have matching checksums, the trees and the underlying data are synchronized.

After the synchronization process, the two trees and the underlying data are typically identical. In alternative embodiments however, the destination objects may not accept certain data, for example when the data is stale or if the trees are being only partially synchronized. In either of these cases, the two trees may be more similar, but not necessarily identical, after the synchronization.

Trees

Referring to FIG. 1, a storage location 10 with a plurality of individually addressable storage locations or objects is illustrated. In this example, an arbitrary view of the data maintained at the storage location 10, including individual object locations labeled A through G, has been defined using an algorithm that segments the data storage location 10 in some predefined or desired manner. The "raw" data in this example maintained at object locations A through G is (1001, 1002, . . . 1007) respectively. While simple integers are used in this example, the raw data maintained in each of these object locations could be of any type, including text, images, the voice, text and/or video media of a conversation, video clips, sensor data, or any other type of data.

From the defined view, a tree 12 is constructed. The tree 12 includes nodes A through G. Each node includes a pointer "A" through "G" provided in each oval, which points to the associated data object A through G in the storage location 10 respectively. The tree is thus an "overlying" structured view of select data objects maintained within an underlying storage location 10. Although the tree 12 overlies the data objects of a single storage location in this example, it should be understood that trees can span one or more storage locations, located on the same device, or different devices connected over a network.

In this example, node A is considered the root since it is located at the top of tree 12. The remaining nodes B through G are considered dependent branch nodes since they depend, either directly or indirectly, from the root node A. In addition, nodes C through G are each considered "leaf" nodes, as no further nodes are dependent off these nodes respectively. Node B is considered an intermediate branch node with dependent leaf nodes F and G. Node B, however, is not considered a root node since it branches off and is dependent on node A.

In an alternative naming scheme, the root node of the tree may be referred to as a parent node and a branch or leaf node may be referred to as a "child" node. In this example, node A is the parent of the tree. Nodes B through G are child nodes with respect to node A. Node B is also a parent node with respect to child nodes F and G.

It should be noted that the particular arrangement of the nodes of the tree of FIG. 1 is arbitrary and has been selected to illustrate certain aspects of the synchronization protocol as described herein. This specific tree, however, should not be construed as limiting in any way. Rather it should be understood that the protocol can be used to synchronize data organized in any tree, regardless of the configuration.

Calculating Checksums

The synchronization method relies on maintaining a Data Checksum or ("DC") value for each node in the tree. The Data Checksum value is a checksum calculation of the raw data contained in the underlying data object associated with each node of the tree. In FIG. 1, the Data Checksum for each node in the tree is contained within each oval. Specifically in this example, the Data Checksum values for nodes A through G are (15, 17, 7, 4, 5, 12 and 10) respectively. The Data Checksum values are derived from a checksum calculation of the raw data (1001, 1002, 1003 . . . 1007) stored at the data objects labeled A through E respectively. In various embodiments, any checksum algorithm may be used.

The synchronization protocol also relies on maintaining a Node Checksum value or "NC" for each node in the tree. The calculation of the Node Checksum differs depending on the hierarchical position of the node in the tree. For leaf nodes, the NC is the same as the Data Checksum value. For parent nodes, the Node Checksum is calculated by combining the Data Checksum values of the parent node and any dependent child/children nodes(s). In one embodiment, the algorithm used to combine the checksum values is the XOR ("$\otimes$") logic operation. In further embodiments, other logical operations, such as the AND, NAND, OR, NOR, NOT, may be used. In yet other embodiments, any algorithm that combines the checksum value of the children nodes(s) and the parent node may be used. As illustrated in FIG. 1, the calculated Node Checksum value "NC" (6, 11, 7, 4, 5, 12, and 10) for each node A through G is provided in the upper left side next to each oval respectively.

For each node A through G in the tree 12 of FIG. 1, raw data values contained in the associated data object, the Data Checksum value, the Node checksum (NC), and the equation used to calculate the NC value using the XOR operation are provided in Table I below. Since nodes A and B are parent nodes, the Node Checksum or "NC" value for these nodes is derived from the XOR operation of the Node Checksum value of each node A and B and all dependent child nodes, as indicated in the last column of the table. The Node Checksum value of leaf nodes C through G are equal to the Data Checksum values of the raw data contained at the underlying data object respectively.

TABLE I

| Node | Raw Data Value | DC Value | NC Value | Checksum Calculation |
|---|---|---|---|---|
| A | 1001 | 15 | 6 | NC(A) = DC(A)⊗ NC(B)⊗ NC(C)⊗ NC(D)⊗ NC(E) |
| B | 1002 | 17 | 11 | NC(B) = DC(B)⊗ NC(F)⊗ NC(G) |
| C | 1003 | 7 | 7 | NC(C) = DC(C) |
| D | 1004 | 4 | 4 | NC(D) = DC(D) |
| E | 1005 | 5 | 5 | NC(E) = DC(E) |
| F | 1006 | 12 | 12 | NC(F) = DC(F) |
| G | 1007 | 10 | 10 | NC(G) = DC(G) |

In various embodiments, the information maintained at each node of a tree, besides those mentioned above, may vary. In one embodiment, the actual raw data stored in the underlying data object may be stored in each associated node. In yet other embodiments, each node may contain information used to identify its position in the tree hierarchy. For example, each node may include an identifier identifying the node as a root, parent, child and/or leaf node respectively. In yet other embodiments, each node may include information identifying any dependent child nodes and/or the parent node from which it is dependent.

Synchronizing Trees

The synchronization protocol involves the comparison of the Data Checksum and Node Checksum values of corresponding nodes of two trees to be synchronized, hereafter referred to as the source and a destination trees. During the synchronization process, the Data Checksum and the Node Checksum values of the nodes of the two trees are compared as the trees are traversed. If the corresponding nodes in the two trees have the same Data and Node Checksum values, then the underlying data corresponding to those nodes, and any dependent nodes, are assumed synchronized. As mismatching or missing nodes are identified, these nodes are updated or added to the destination tree, and the underlying data of the associated source object(s) is copied by the destination object(s) in a unidirectional process.

When a node in the destination tree is either added or updated, the Data Checksum value of the node is dynamically updated. In addition, the Node Checksum values of the node, and all parent nodes from which the node is either directly or indirectly dependent, are all each dynamically updated. When the Data and Node Checksum values of all the nodes of the two trees are the same, the two trees, and the underlying data objects, are synchronized.

The typical result after a synchronization operation is the destination and source trees and the underlying data are both identical. In situations where the destination tree includes no nodes not already included in the source tree, then the synchronization operation will result in the destination tree and the corresponding underlying data being the same as the source tree and its underlying data respectively.

There are several situations, however, where the synchronization results in the destination tree and its underlying data being more similar to, but not identical, to the source tree and underlying data. For example, if the destination contains data that is more current than the corresponding data of the source, then the destination may not accept the "stale" data. As a result, the source and destination trees and underlying data may not be identical after the synchronization operation.

In another situation, if the destination tree includes one or more nodes not included in the source tree, then these nodes, and the underlying data, are not typically removed during the synchronization process. As a result, the destination tree will not necessarily be the same as the source tree after the synchronization is complete.

In yet another situation, only a select portion of two trees may be partially synchronized. In this case, the non-synchronized portions of the trees may not be the same after the synchronization.

The Synchronization Protocol

Figure 2A:
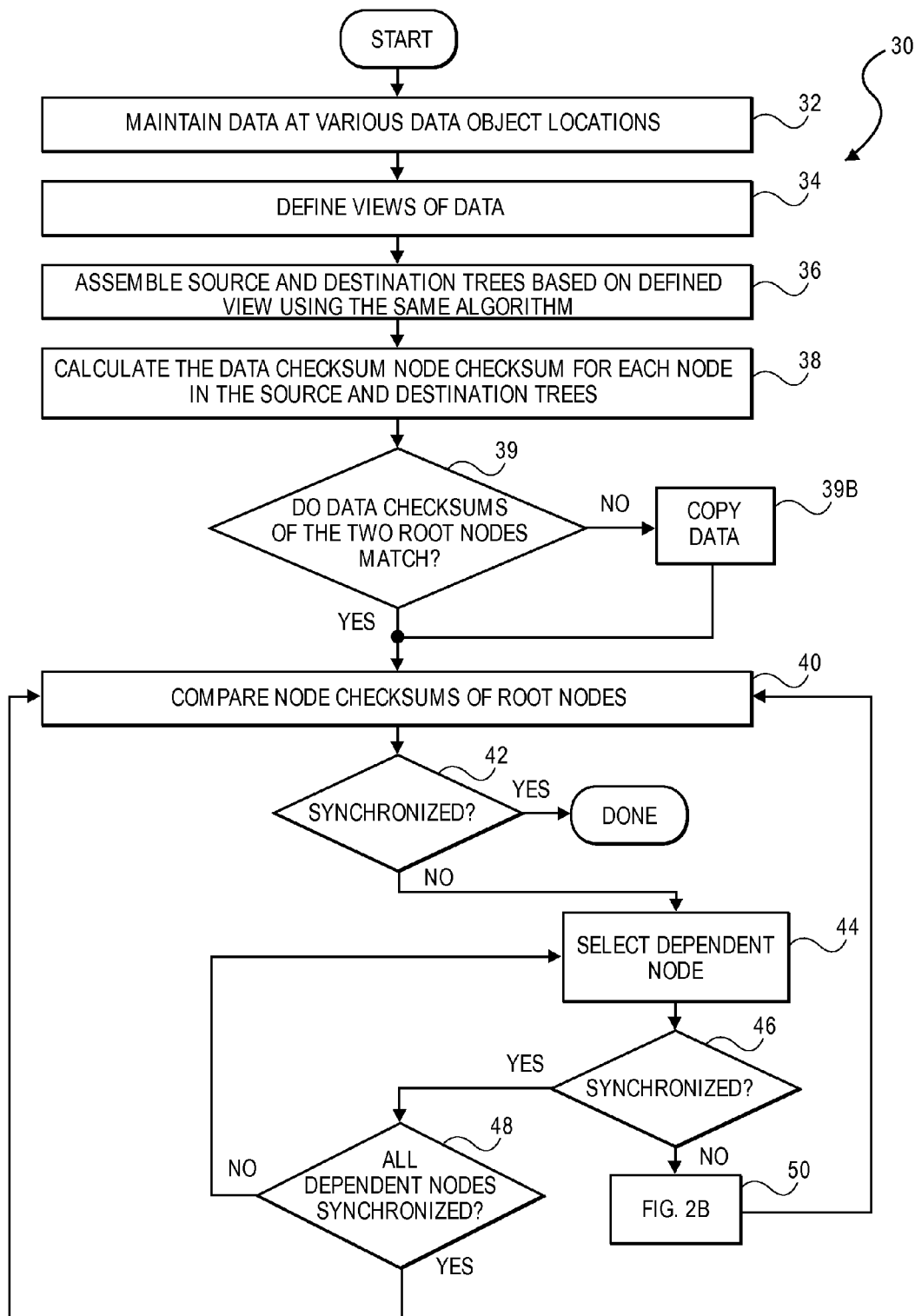
FIGS. 2A-2C are flow charts illustrating the protocol for synchronizing source and destination trees according to the present invention.
Figure 2B:
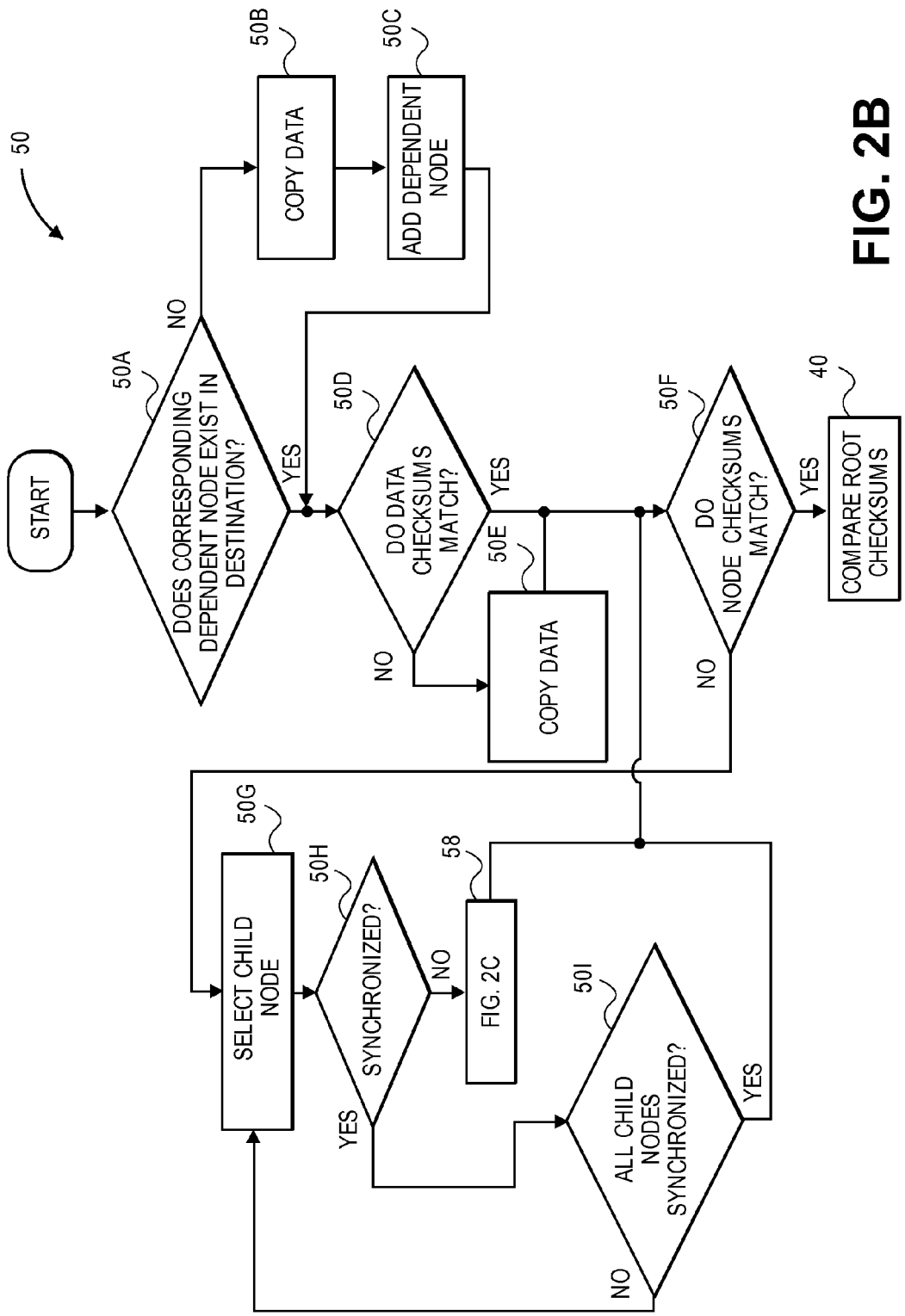
Figure 2C:
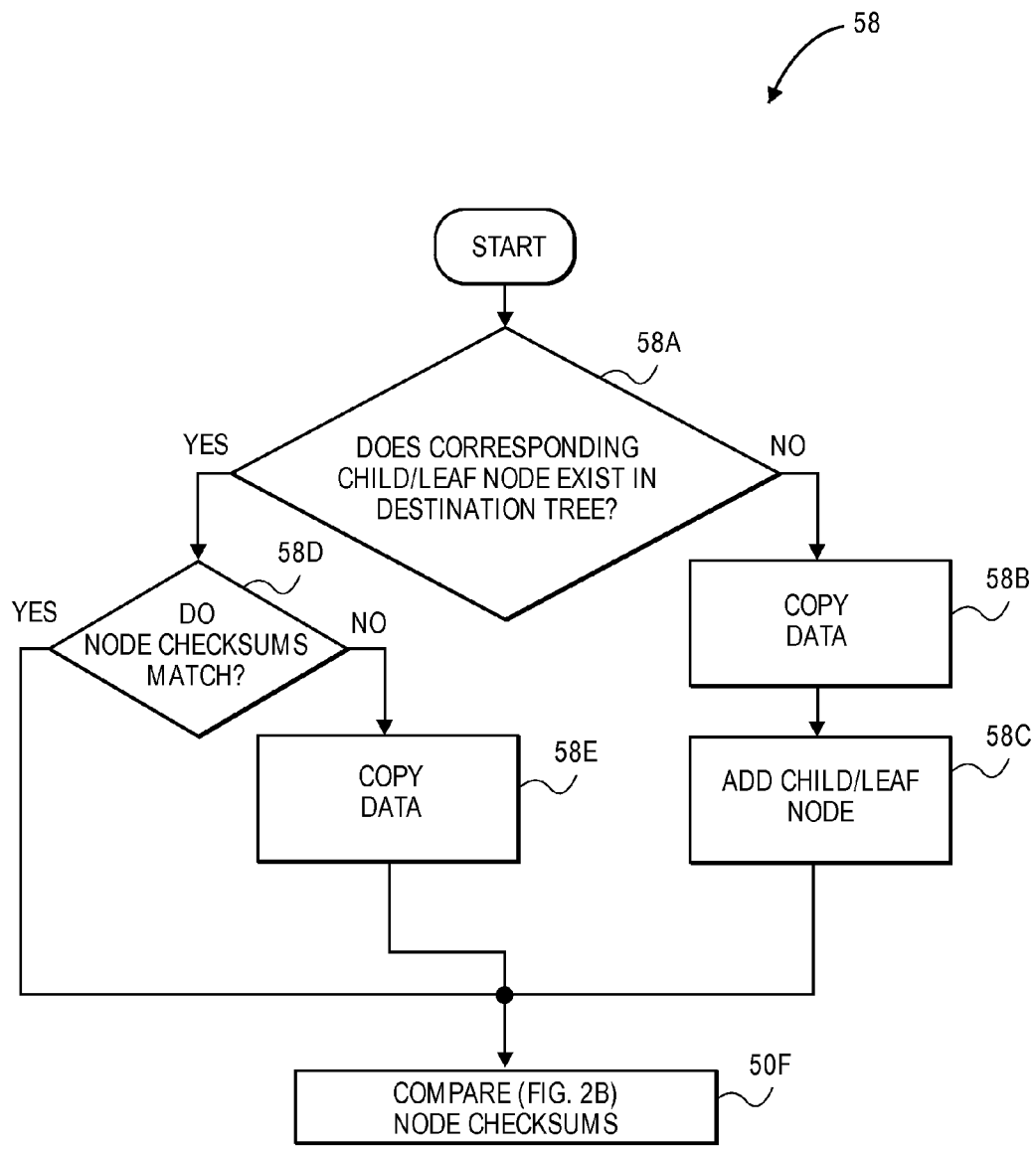

Referring to FIGS. 2A-2C, a flow chart 30 illustrating the protocol for synchronizing two trees according to one embodiment is shown. In the initial step, data is maintained or stored at the various source and destination data object locations (step 32). Source and destination views of the stored data are then defined (step 34) followed by the assembly, using the same algorithm, of the overlying source and destination trees based on the defined views (step 36). The Data Checksum and the Node Checksum are calculated for each node in the source and destination trees (step 38) respectively. The synchronization of the source and destination trees is now ready to be performed.

In the initial step 39, the Data Checksums of the two root nodes are compared. If the Data Checksums are not the same, in step 39B the data of the source node is copied by the destination node. Next the Node Checksums for the two root nodes of the source and destination trees are compared (step 40) to determined if the two trees are already synchronized (decision 42). If the Node Checksums are the same, then it is assumed that the two trees are synchronized and no further action need be taken. On the other hand if the Node Checksums of the two roots are different, then the two trees are not synchronized.

If not synchronized, then the trees need to be traversed. In the initial step, a dependent node in the source tree is selected (step 44). In decision diamond 46, it is determined if the corresponding node in the destination tree is synchronized by comparing the Node Checksums. If yes (i.e., the Node Checksums match), then it is determined in decision diamond 48 if all the other dependent nodes in the source tree have already been synchronized. If no, then another dependent node is selected. Steps 44 through 48 and 50 are repeated as necessary until the Node Checksums of the roots of the two trees are same, indicating the two trees are synchronized.

Whenever decision 46 determines that a selected dependent node is not synchronized with its counterpart, either because the Node Checksums do not match or there is no corresponding node in the destination tree, then the selected dependent node, and possibly any dependent child nodes, are synchronized using the synchronization operation 50 as described below with regard to FIG. 2B. After each synchronization operation 50 is performed, the Node Checksums of the two roots are again compared (step 40) for synchronization (diamond 42). If the root Node Checksum values do not match, another dependent node is selected (step 44) and the above process is repeated. If the Node Checksum values of the two roots are the same, however, the two trees are assumed synchronized. As a result, the traversing of the trees is terminated.

Referring to FIG. 2B, a flow diagram for synchronizing a selected dependent node, and any dependent child nodes, is illustrated. In the initial decision (50A), it is determined if a corresponding node exists in the destination tree. If not, the source data is fetched and copied by the destination (step 50B) and the missing dependent node is added to the destination tree (step 50C).

If the corresponding dependent node exists in the destination tree, then the Data Checksum values of the two dependent nodes are compared (decision 50D). If there is no match, then the source data is fetched and copied (step 50E) by the associated destination object. If the Data Checksum values match, either initially or after the fetch and copy operation, then the Node Checksum values are compared (decision 50F). If there is a match, then Node Checksums of the two roots are again compared to see if the two trees are now synchronized, as provided in step 40 of FIG. 2A. If there is no match, then the dependent child nodes, branching off the node selected in step 44, are traversed. The traversed child nodes include both those directly and indirectly branching off the selected dependent node, including any leaf nodes, until the Node Checksums of the selected dependent node are synchronized.

In step 50G, a child node is selected. In decision 50H, it is determined if the selected child node is synchronized with its counterpart in the destination tree. If yes, then it is determined if all the dependent child nodes of the selected dependent node have been synchronized (decision 50I). If not, another dependent child node is selected and the steps 50G, 50H, 50I and 58 are performed as necessary, until all dependent child nodes are synchronized. When all the dependent child nodes are synchronized, then control is returned to decision diamond 50F and Node Checksums and Root Checksums are checked for matching as provided in decision diamonds 50F and 40/42 respectively.

Whenever a dependent child node is not synchronized (decision 50H), then the synchronization operation 58 as described below with regard to FIG. 2C is performed. After the synchronization, the Node Checksums of the selected dependent nodes are again compared in step 50F. If there is a match, the then Root Checksums, as provided in steps 40/42 are compared to determine if the trees are now synchronized. If there is no match, then another dependent child node is selected (step 50G) and the above process is repeated until all the Data Checksums and Node Checksums of all the dependent nodes match.

Referring to FIG. 2C, a flow diagram for synchronizing a child node as determined in decision 50H of FIG. 2B is illustrated. In the initial decision 58A, it is determined if a corresponding child/leaf node exists in the destination tree. If no, then the source data is fetched and copied (step 58B) by a destination data object. A corresponding child node is also added to the destination tree (step 58C). On the other hand, if a corresponding child/leaf node exists, then the Node Checksums are compared (decision diamond 58D). If there is a no match, the underlying source data is fetched and copied by the associated destination data object. Regardless if the child node is added, updated or already has matching Node Checksums, control is returned to step 50F of FIG. 2B and then steps 40/42 of FIG. 2A, where it is determined if the Node Checksums (Decision 50F) of the selected dependent nodes and possibly the root nodes (40/42) are synchronized or not.

With the above process, each time a node is updated or added to the destination tree, the Data Checksum and Node Checksum values of any nodes above the updated or added node in the destination tree are dynamically updated as well. By "rolling up" the Data and Node Checksum values up the tree, the Node Checksum values for the root nodes may be compared after each update. When the Node Checksums at the root converge or match, the trees are synchronized and the trees no longer need to be traversed. This feature improves efficiency by reducing and possibly eliminating the need to compare all the corresponding nodes of the trees.

In various embodiments, optimization algorithms may be used to prioritize the dependent and/or child/leaf nodes selected for synchronization. For example, an algorithm may be used that prioritizes the selection of nodes based on the when they were updated relative to other nodes. With one algorithm, it is assumed that the nodes most recently updated are most likely to be updated again. As a result, the most recently updated nodes are prioritized in the selection process. Alternatively, the opposite assumption can be made, where the least recently updated nodes are prioritized. The actual optimization algorithm used depends on the computing environment and a wide variety of factors. Regardless of the algorithm used, the intelligent selection of nodes will often result in efficiencies by first targeting those nodes most likely to be out of synchronization. Whenever mismatching nodes can be quickly identified, the number of nodes that need to be traversed to achieve synchronization is kept to a minimum, thereby increasing the efficiency.

Referring again to FIG. 2A, the selection of a dependent node at step 44 and/or a child node at synchronization operation 50 may follow a number of different traversal protocols. For example, all the nodes of a particular branch may be selected. When the branch is fully traversed, then the nodes of a next branch are traversed and synchronized. This process is repeated for each branch in the tree. In another alternative embodiment, all the nodes of a hierarchical level of the tree may be successively selected and synchronized. When all the nodes on one level are synchronized, the nodes of the next hierarchical level are synchronized. This process is repeated until all the hierarchical levels in the tree have been synchronized. With either embodiment, the tree can be traversed from top to bottom or from bottom to top. With either embodiment however, it is preferred that the tree be traversed from top to bottom. A top down approach is more efficient since whenever a parent node is synchronized, it is assumed that any child nodes are also synchronized. With a bottom to top of the tree approach, this efficiency is often lost.

Synchronization Example

Figure 3A:
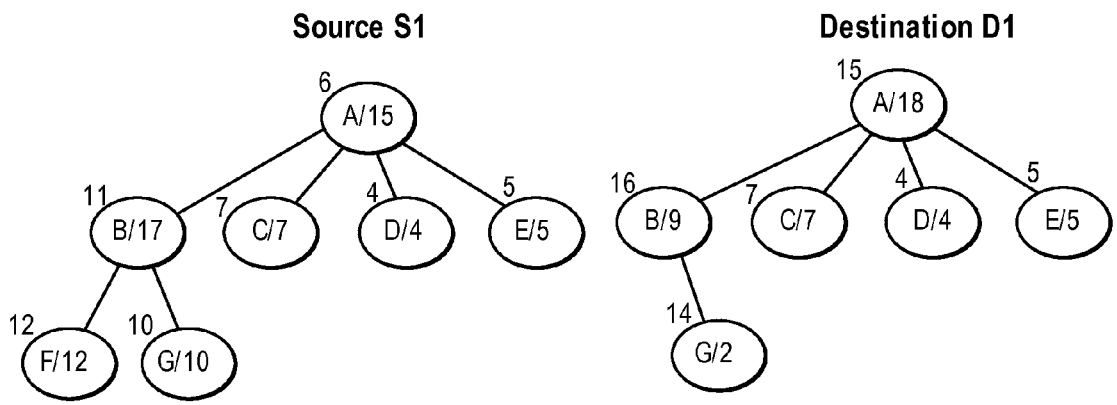
FIGS. 3A and 3B illustrate source and destination trees and storage locations before and after a synchronization operation according to the present invention.

Referring to FIG. 3A, two trees to be synchronized are illustrated. The first is the source tree S1, which is identical to the tree illustrated in FIG. 1. The source Tree defines a view of the underlying data stored at object locations A through G of storage device designated 10(S). The raw data value contained in each addressable location is represented by the number value (1001, 102, 1003 . . . 1007) contained in the oval of each object location A through G respectively. The destination tree D1 defines a view of the underlying data (1001, 1002 . . . 1005 and 6721) stored at object locations A through E and node G of storage device 10(D) respectively. The Data Checksum and the Node Checksum for each node A through G of the source tree S1 and nodes A through E and node G of the destination tree D1 is provided within and to the left of each oval respectively.

The source tree S1 and the destination tree D1 differ in two regards. The destination tree D1 does not include a node F. Also, the underlying data values corresponding to node G in the two trees S1 and D1 are different (i.e., 1007≠6721). As a result, the Data Checksum and Node Checksum values for nodes A, B and G are each different in the two trees S1 and D1.

Using the protocol of FIGS. 2A through 2C, the source S1 and destination D1 trees may be synchronized. In this example, it is understood that the initial steps 32 through 38 have already been performed, resulting in the source S1 and destination D1 trees and the Data and Node Checksum values as illustrated and provided in FIG. 3A.

In the initial synchronization protocol step 40 of FIG. 2A, it is determined that the Node Checksum of root node A for the two trees S1 and D1 are different (i.e., 6≠15) and not in synchronization (decision 42). As a result, the root and dependent nodes of the two trees need to be traversed. In this example, node B is selected (step 44 of FIG. 2A). Since the Node Checksums of node B of the two trees S1 and D1 do not match (i.e., 11 ≠16), the flow diagram of FIG. 2B is used to synchronize the two nodes. Steps 50A through 50C are used to identify and add missing node F to the destination tree D1. Steps 50A, 50D through 50I and the flow diagram of FIG. 2C, are used to update mismatching node G. Nodes C, D, and E are each leaf nodes dependent on root node A. By repeating steps 44 through 48 of FIG. 2A, it is determined that these nodes are already in synchronization.

Figure 3B:
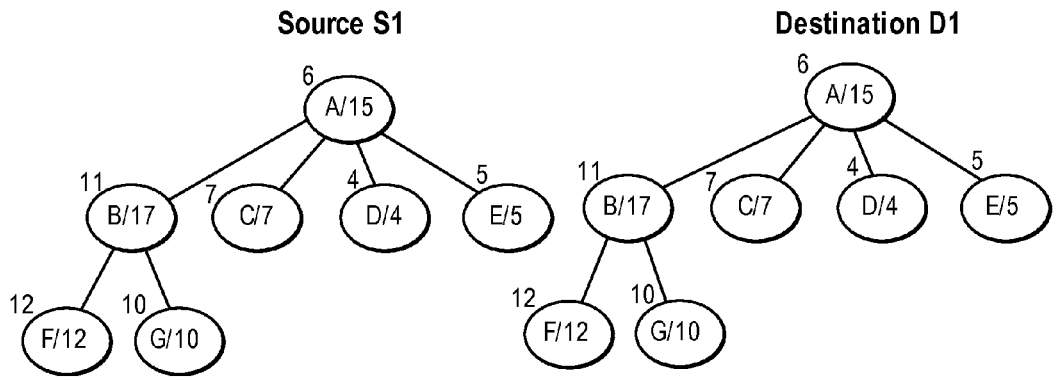

Referring to FIG. 3B, the two trees S1 and D1 are illustrated after the synchronization operation. As illustrated, the two trees S1 and D1, including the Data Checksum and Node Checksum values of each node, are identical. In addition, the two arrows from object locations G and F in storage device 10(S) to the object locations designated G and F in storage device 10(D) show the synchronization of the underlying source and destination data.

Bidirectional Synchronization

Referring to FIG. 4, a diagram illustrating bidirectional synchronization between two trees is shown. In this example, a first synchronization operation 70 is being performed between tree 74 and tree 76. With this first synchronization operation, tree 74 is the source and tree 76 is the destination. With a second synchronization 72, tree 76 is the source while tree 74 is the destination. With both operations, the synchronization protocol described in relation to FIGS. 2A through 2C is used to synchronize the source and destination trees and the underlying data respectively. In accordance with various embodiments, the two synchronization operations may take place at different times or at the same time. When the two synchronization operations 70 and 72 occur at the same time, the two trees 74 and 76 can be updated in both directions, effectively resulting in simultaneous bidirectional synchronization.

Bidirectional Synchronization Example

In the communication system and method described in U.S. application Ser. Nos. 12/028,400, 12/253,816 and 12/419,861, each incorporated by reference herein for all purposes, a communication application is disclosed that is intended to run on wired or wireless communication devices, computers, and/or servers, interconnected by a network. At each location (i.e., substantiation) of the communication application, one or more data stores of data may be maintained. In various embodiments, the data may include conversation lists, list of contacts, the members or participants of each conversation, the presence status of the participants of a conversation, user domains, groups of contacts, select properties of various data objects, records of media that has been reviewed or consumed, groups of conversations, device nodes, list of streams of media of conversations, actual streams of media, etc.

The data maintained at these different data stores of either the same or different substantiations of the communication application may be organized into structured views using an algorithm that segments the data into trees of nodes. For example, the data maintained on a user's work communication device and a personal communication device, each running the communication application, may each be organized into a structural view that defines the roles of the user respectively. Once the two views have been defined, tree representations of the work and personal contact information may be constructed and synchronized.

Figure 5B:
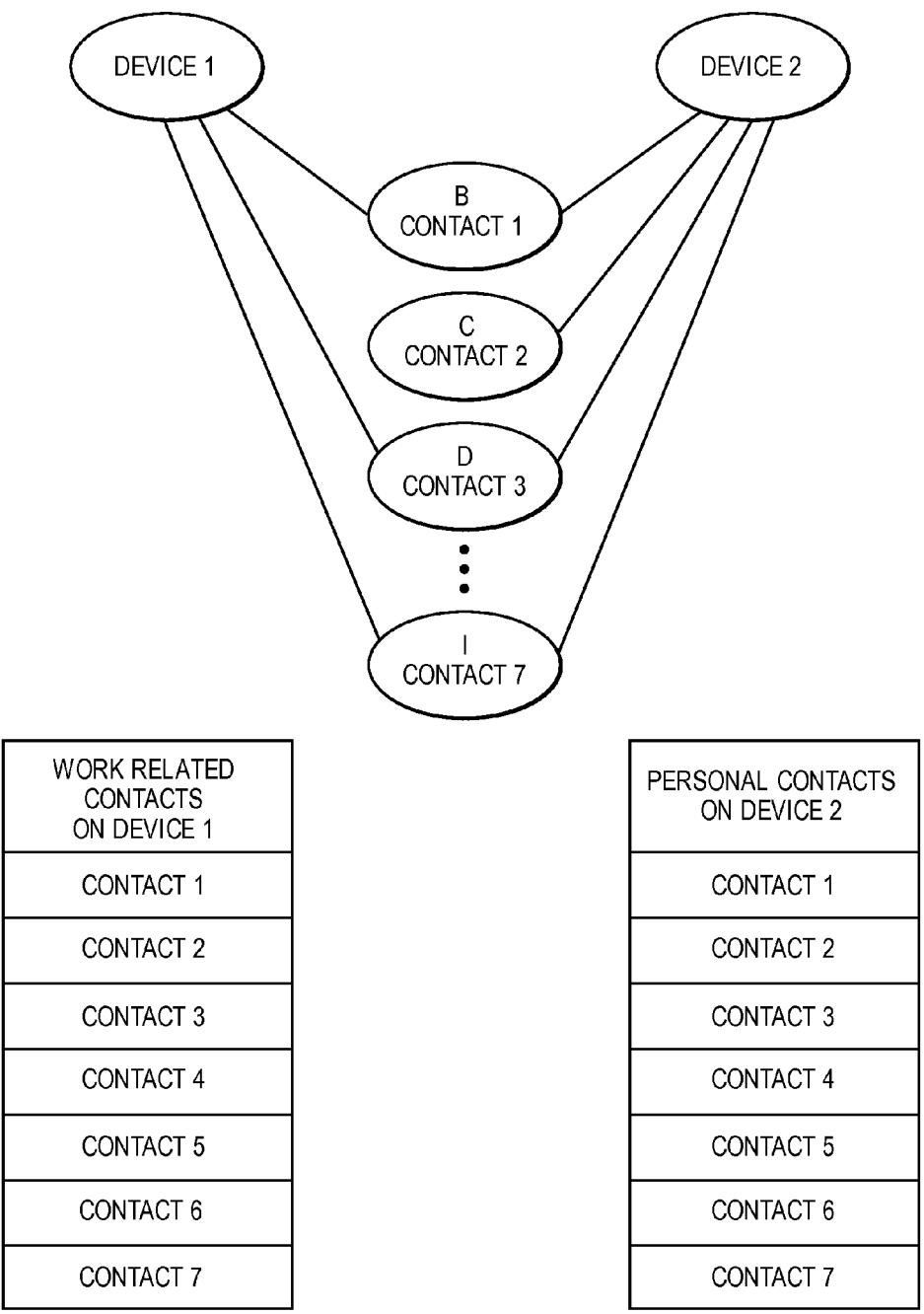

Referring to FIG. 5A, two trees representative of two views prior to synchronization are illustrated respectively. "View 1" defines the contact information maintained "Device 1". The representative tree includes Device 1 (e.g., a user's work computer or phone) at the root and dependent nodes B through F, which are associated with contacts 1 through 5 respectively. View 2 defines contacts maintained on second device or "Device 2" (e.g., a user's home computer or phone). The representative tree includes Device 2 at the root and dependent nodes F through I, which are associated with contacts 5 through 7 respectively. After the Views 1 and 2 have been defined, a bidirectional synchronization operation may be performed so that the contact list on Device 1 is added to the contact list on Device 2 and vice versa. The arrows provided between the two stores show the flow of the contact data as a result of the first and second synchronization operations respectively. The results of the two synchronizations are illustrated in FIG. 5B. The two trees and the contact lists on the two devices are synchronized.

The example of FIGS. 5A and 5B is useful to note two aspects of the synchronization protocol. Data need not be associated with every node in a tree. In the FIGS. 5A and 5B example, the Device 1 and 2 nodes are associated with the user's work and personal devices respectively, not data. As a consequence, there is no synchronization of the data per se at the Device 1 and Device 2 root nodes. However, the underlying contact information of the two trees is synchronized after the operation. It is also useful to note that any nodes synchronized in the first operation typically do not need to be synchronized in the second operation since they presumably are already synchronized. For example if nodes B through E are added to the second tree during a first synchronization operation, these nodes may not need to be traversed during a second synchronization when nodes H and I are added to the first tree.

Views and Trees

Examples

Referring to FIGS. 6A-6D, diagrams of data contained in data object tables and various trees defining multiple views of the data according to examples of the present invention are shown.

In FIG. 6A, a user data object table and a message list by year object table are illustrated. The user table includes three entries, each identifying the name of a user, their user identifier (ID), and their "special" status respectively. The message list table shows the message numbers by year from 2004 through 2009 for user ID 1 (John Doe) and user ID 3 (Jim Bob) for the year 2009. From the data contained in these two object tables, a number of trees defining different views of the underlying data can be constructed.

Figure 6B:
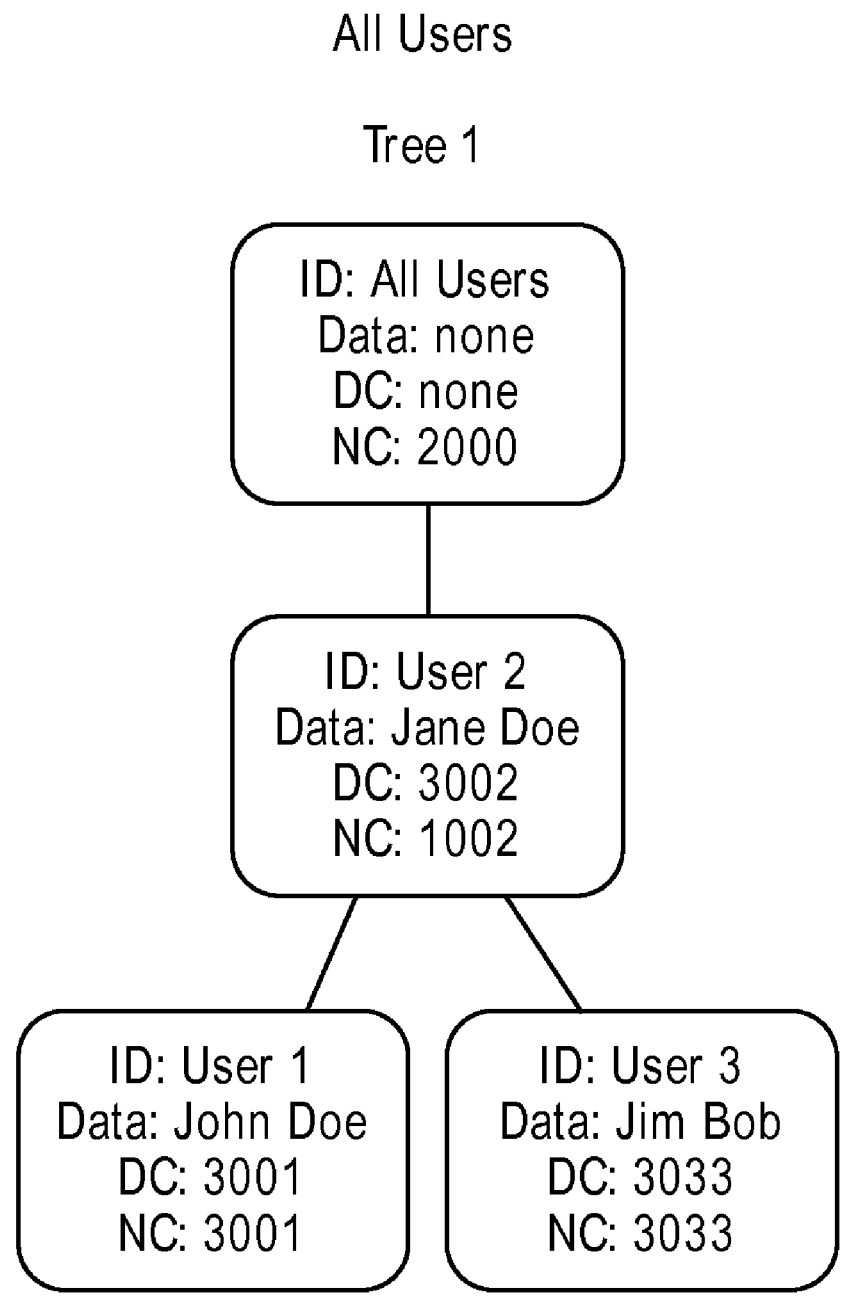

FIG. 6B for example illustrates a tree representative of all the users provided in the object tables. The root of the tree is labeled "All Users". Each dependent node is associated with one of the users (identified by ID 1, 2 and 3) respectively. The Data Checksum ("DC") and Node Checksum ("NC") values are provided in each node.

Figure 6C:
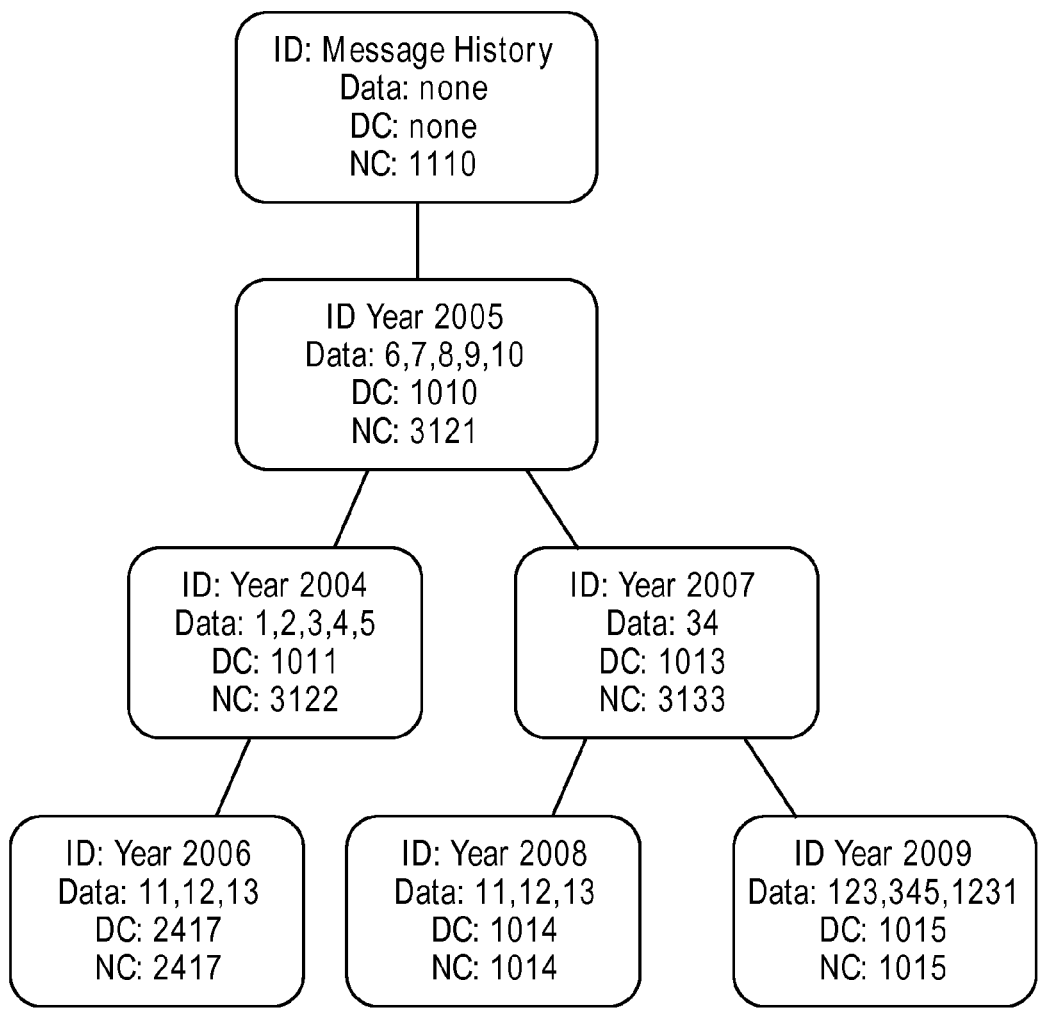

FIG. 6C illustrates a second tree that is representative of a view defined as the message history of user 1 by year. The root node is entitled the Message History, whereas the dependent nodes each provide the message history for user 1 for years 2004 through 2009 respectively. The NC and DC values are provided within each node along with the data from the appropriate object tables.

Figure 6D:
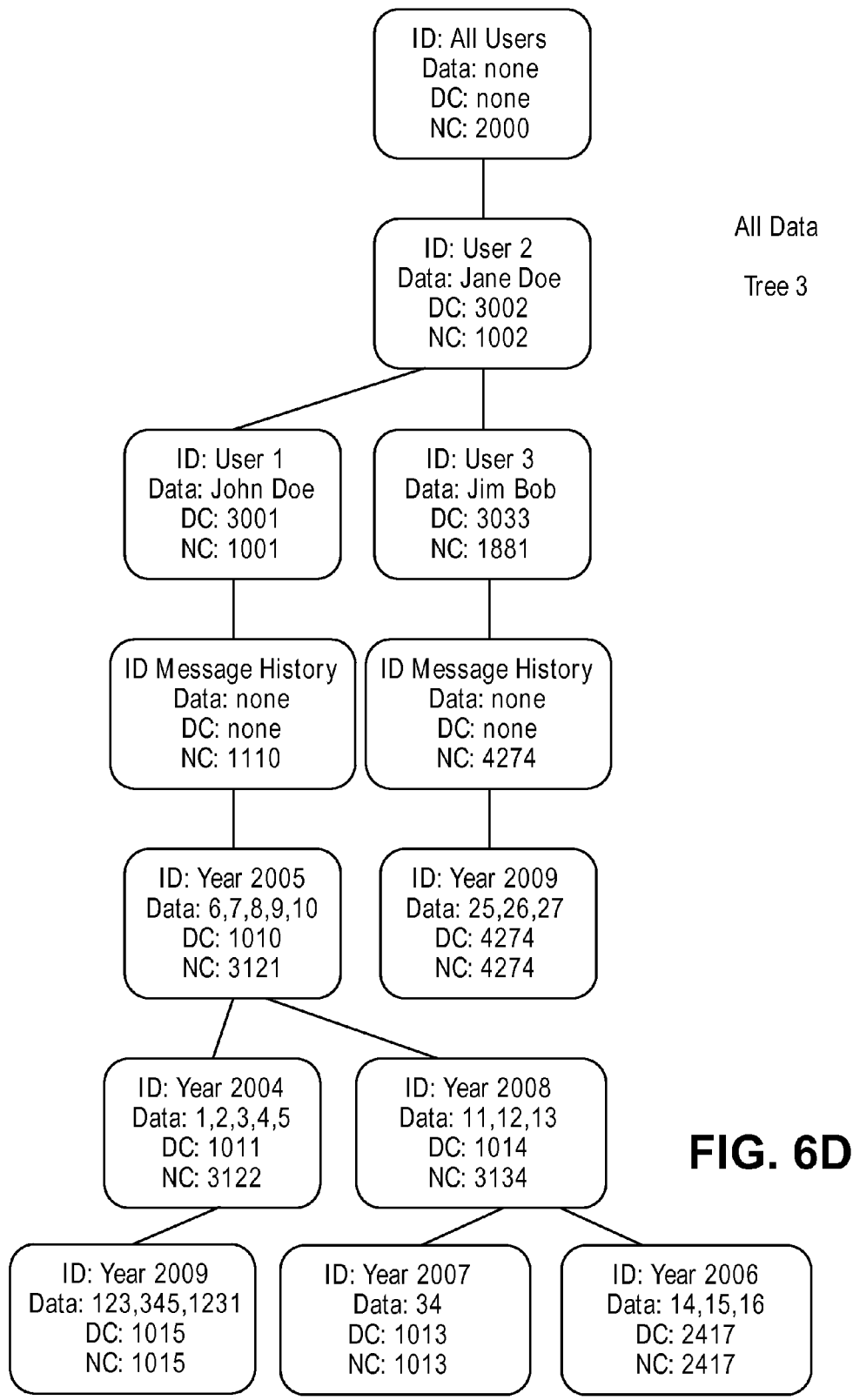

FIG. 6D illustrates another tree that is representative of all the data contained in the two object tables. In this example, the root node is labeled "All Data", whereas the dependent nodes list information for Users 1, 2 and 3 and the message history for user 1 for years 2004 through 2009 and user 3 for 2009. Again, the NC and DC values are provided within each node.

Figure 6E:
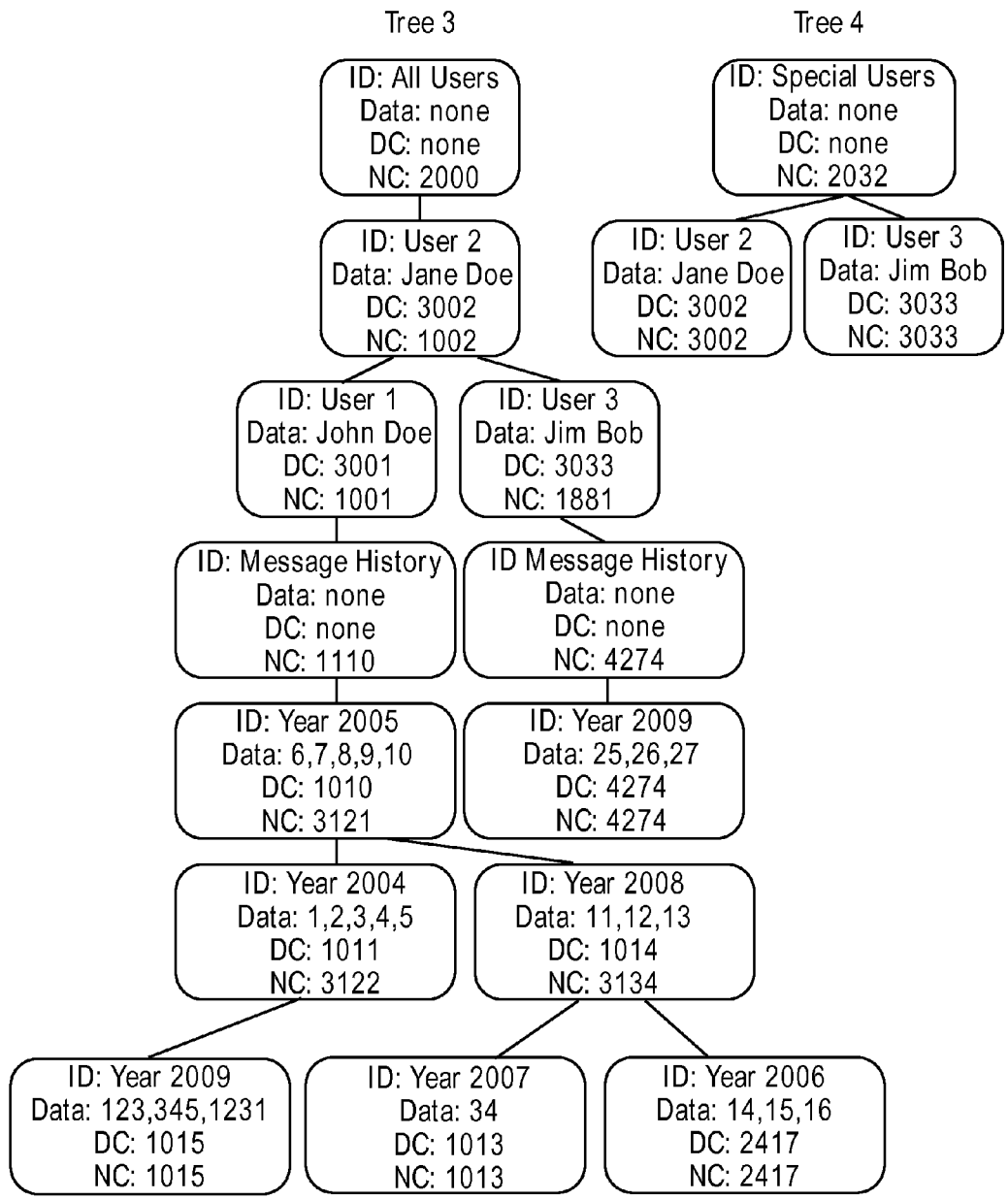

FIG. 6E illustrates two trees, the "All Data" tree as illustrated in FIG. 6D and another the tree labeled "Special Users". In the Special Users tree, dependent nodes are provided for only users 2 and 3 since they are both designated as "special" in the user Table of FIG. 6A.

The above examples are provided for illustrating several features. For example, a tree can be constructed from two or more different types of underlying data (i.e., Tree 3). A tree can also be constructed from two or more data object tables (i.e., Tree 3). Different trees can be constructed from the data in the same object table (i.e., Tree 1 and Tree 4 are both constructed from the same object table). In all cases though, the source tree and the corresponding destination tree are constructed using the same algorithm applied to the underlying data. It should be understood that the different types of data stored at the various locations of the object tables may be viewed in a variety of different and arbitrary ways. As such, the actual number of possible object tables, views and resulting trees is far too numerous to practically list herein. Consequently, it should be understood that a view and a subsequent assembly of a tree can be based on any arbitrary or select grouping of any stored data.

Partial Tree Synchronization

In certain circumstances, it may be desirable to synchronize only a portion of a tree. With partial synchronizations, the destination tree may decide it is interested only in data associated with the source tree above a selected source node. For the partial synchronization to occur, the Data Checksum values of the selected source node and the corresponding destination nodes are synchronized as described above, meaning Data Checksum values are compared and a missing or mismatching corresponding destination node and data is added or updated in the destination tree and destination data object respectively. For the Node Checksum value however, the destination node simply copies the Node Checksum value of the selected source node. Since the dependent nodes below the selected node are not synchronized, there is no other way to calculate and compare the Node Checksum values of the corresponding destination node and the selected source node. As a result, the Node Checksum value is copied and a flag is set indicating that the nodes below have not been synchronized. The underlying data any dependent nodes therefore need not be synchronized. The destination tree is thus "pruned" below the selected source node. With the flag set, a later synchronization operation involving the dependent node will not rely on the "copied" Node Checksum value but rather an actual computed Node Checksum value computed using the actual data values associated with any dependent nodes.

For example, if a user has 100 contacts in their contact list, but typically only uses 10 of the contacts, then it may not be desirable to perform a full synchronization operation for all 100 contacts. In this example then, a partial tree synchronization including only the 10 most commonly used contacts may be performed. This is just one example. It should be understood that partial tree synchronizations could be performed using any arbitrarily defined common characteristic or feature. In another example, only the user data in Tree 3 illustrated in FIG. 6D may be synchronized in a partial tree synchronization. In this example, the root node entitled "All Users" and the nodes labeled Use 1, User 2 and User 3 would be synchronized. The nodes related to the Message History of User 1, however, would not be synchronized.

Priority Based Synchronization

In certain circumstances, the data provided from a source to a destination may be prioritized. With this embodiment, higher priority synchronization operations are performed before lower priority synchronization operations. For example, the synchronization of a list of favorite contacts may be prioritized over the synchronization of a full contacts list.

Accepting Synchronization Data

The data from a source used to synchronize a corresponding destination is typically accepted. There are situations, however, when the destination may not accept the data. For example, a destination may accept synchronization data only when it is considered "new" relative to the data already at the destination. If the synchronization data is "old", meaning the source data is stale and no longer accurate, the destination storage location and tree may not accept the update. The acceptance or rejection of data requires that the data be time-stamped. By noting the time-stamp, a destination can determine if data should be rejected because it is stale or accepted because it is timely or relevant. In other embodiments, source data may be rejected based on other defined criteria. The acceptance or rejection of object data, regardless of the criteria, may be implemented with either unidirectional or bidirectional synchronization operations.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. A method for synchronizing user data, comprising:
   maintaining user data at a plurality of user data objects;
   assembling a source tree, the source tree including a source root node and one or more dependent source nodes, the nodes of the source tree associated with source user data maintained at the plurality of user data objects;
   assembling a destination tree, the destination tree including a destination root node and one or more dependent destination nodes, the nodes of the destination tree associated with destination user data maintained at the plurality of user data objects;
   performing one or more checksum calculations for the nodes of the source tree and the destination tree based on the associated source user data and the associated destination user data maintained at the plurality of user data objects respectively; and synchronizing the destination tree and the destination user data with the source tree and source user data based on the comparison of the one or more checksum calculations of corresponding nodes in the source tree and the destination tree respectively by traversing the nodes of the source tree using an optimization algorithm to identify the nodes of the destination tree likely to be missing and/or have mismatching checksum values relative to the corresponding nodes of the source tree, wherein missing nodes or nodes having mismatching checksums value(s) in the destination tree are added or modified to match the corresponding node or nodes in the source tree.

2. The method of claim 1, further comprising:
defining a source view of the user data maintained at one or more of the plurality of user data objects; and
assembling the source tree, including the source root node and the one or more source dependent nodes, representative of the defined source view of the user data.

3. The method of claim 2, further comprising:
defining a destination view of the user data maintained at one or more of the plurality of user data objects; and
assembling the destination tree, including the destination root node and the destination dependent nodes, representative of the defined destination view of the user data.

4. The method of claim 1 wherein the source tree and the destination tree are each assembled using the same algorithm.

5. The method of claim 1, wherein synchronizing the destination tree and the destination user data with the source tree and source user data based on the one or more comparisons of the checksum calculations of corresponding nodes in the source tree and the destination tree further comprises:
comparing checksum values for the source root node and the destination root node; and
assuming the source tree and the destination tree are synchronized if the checksums values for the source root node and the destination root node are the same.

6. The method of claim 1, synchronizing the destination tree and the destination user data with the source tree and source user data based on the one or more comparisons of the checksum calculations of corresponding nodes in the source tree and the destination tree further comprises:
ascertaining when the checksum values for the source root node and the destination root node are different; and
traversing the source tree and the destination tree when the ascertained checksum values for the source root note and the destination root note are different by:
(i) selecting a dependent node in the source tree;
(ii) ascertaining if there is a corresponding node in the destination tree corresponding to the selected node in the source tree;
(iii) ascertaining if the corresponding node in the destination tree has a different checksum value than the selected node in the source tree;
(iv) copying the user data in the user data object associated with the selected source node into the user data object associated with the corresponding node in the destination tree if the checksum values are different;
(v) updating the checksum value of the corresponding node in the destination tree to match the selected node in the source tree;
(vi) updating and comparing the checksum values for the source root node and the destination root node after performing (i) through (v);
(vii) successively repeating (i) through (vi) until the checksum values of the source root node and the destination root node match; and
(viii) terminating the traversal of the source tree and the destination tree when the checksum values for the source root node and the destination root node match.

7. The method of claim 1, wherein synchronizing the destination tree and the destination user data with the source tree and source user data based on the one or more comparisons of the checksum calculations of corresponding nodes in the source tree and the destination tree further comprises:
ascertaining when the checksum values for the source root node and the destination root node are different; and
traversing the source tree and the destination tree when the ascertained checksum values for the source root note and the destination root note are different by:
(i) selecting a dependent node in the source tree;
(ii) ascertaining if there is a corresponding node in the destination tree corresponding to the selected node in the source tree;
(iii) adding the corresponding node to the destination tree if there is no corresponding node in the destination tree;
(iv) associating a user data object with the corresponding node added to the destination tree;
(v) copying the user data in the user data object associated with the selected source node into the user data object associated with the added node in the destination tree;
(vi) updating the checksum value of the added corresponding node in the destination tree to match the selected node in the source tree;
(vii) updating and comparing the checksum values for the source root node and the destination root node after performing (i) through (vi); and
(viii) successively repeating (i) through (vii) until the checksum values of the source root node and the destination root node match; and
(ix) terminating the traversal of the source tree and the destination tree when the checksum values for the source root node and the destination root node match.

8. The method of claim 1, wherein synchronizing the destination tree and the destination user data with the source tree and source user data based on the one or more comparisons of the checksum calculations of corresponding nodes in the source tree and the destination tree further comprises:
ascertaining when the checksum values for the source root node and the destination root node are different;
traversing the source tree and the destination tree when the ascertained checksum values for the source root note and the destination root note are different by:
(i) selecting a dependent node in the source tree;
(ii) ascertaining if there is a corresponding node in the destination tree corresponding to the selected node in the source tree;
(iii) comparing the checksums values of the selected source node in the source tree and the corresponding node in the destination tree if there is a corresponding node in the destination tree; and
(iv) assuming the selected node in the source tree and the corresponding node in the destination tree are synchronized if the compared checksum values are the same.

9. The method of claim 8, further comprising assuming any source and destination nodes, dependent on the selected node in the source tree and the corresponding node in the destination tree having matching checksum values, are also synchronized.

10. The method of claim 1, further comprising:
prioritizing the user data maintained at the plurality of user data objects in a priority order; and
performing the synchronization of the nodes of the source tree and the destination tree in the priority order.

11. The method of claim 1, further comprising:
ascertaining a select portion of the source tree and the destination tree; and
synchronizing the differences between only the select portion of the source tree and the destination tree.

12. The method of claim 11, further comprising:
selecting a node in the source tree;
synchronizing the node or nodes of the source tree and the destination tree at the selected node and above the selected node; and
not synchronizing the node or nodes of the source tree and the destination tree below the selected node.

13. The method of claim 12, wherein synchronizing the node or nodes of the source tree and the destination tree above the selected node further comprises:
copying the checksum value of the selected source tree node at the corresponding selected destination tree node; and
setting a flag indicating that the node or nodes below the selected nodes of the source and destination trees have not been synchronized.

14. The method of claim 1, further comprising:
ascertaining if user data intended for synchronizing one or more destination user data objects is stale; and
not updating the destination tree or accepting the stale user data at the one or more destination user data object for stale user data.

15. The method of claim 1, further comprising performing a second synchronization between the source tree and the destination tree, wherein during the second synchronization, the destination tree is the source tree and the destination tree is the source tree.

16. The method of claim 15, further comprising performing the synchronization and the second synchronization at the same time.

17. The method of claim 1, wherein performing the one or more checksum calculations for the nodes of the source tree and the destination tree further comprises computing user data checksum values for the source user data and the destination user data maintained at the plurality of user data objects associated with the nodes of the source tree and the destination tree respectively.

18. The method of claim 1, wherein each of the one or more nodes in the source tree and the destination tree is further characterized as one of the following:
(i) a parent node having one or more dependent nodes; or
(ii) a leaf node having no dependent nodes.

19. The method of claim 18, wherein performing the one or more checksum calculations for the nodes in the source tree and destination tree, including parent nodes and leaf nodes, further comprises calculating a node checksum value for each of the nodes in the source tree and destination tree respectively.

20. The method of claim 19 wherein calculating the node checksum value for each node characterized as a leaf node in the source tree and the destination tree further comprises:
identifying the user data objects associated with each of the leaf nodes in the source tree and the destination tree;
calculating the node checksum value using a checksum algorithm on the user data maintained at the identified user data objects associated with each of the leaf nodes in the source tree and the destination tree respectively.

21. The method of claim 19, wherein calculating the node checksum value for each node characterized as a parent node in the source tree and the destination tree further comprises:
identifying the user data objects associated with each of the parent nodes and the dependent nodes of the parent nodes in the source tree and the destination tree respectively; and
calculating the node checksum value for each of the parent nodes based on a combination of (i) a user data checksum value of the user data maintained at the user data objects associated with each of the parent nodes and (ii) the node checksum value of the dependent nodes of the parent nodes respectively.

22. The method of claim 21, wherein the combination of (i) and (ii) is based on a logical operation.

23. The method of claim 1, wherein the user data maintained at the plurality of user data objects comprises one or more of the following types of user data:
(a) voice media;
(b) video media;
(c) text media;
(d) sensor data;
(e) image media;
(f) the media of a conversation;
(g) a conversation list;
(h) a list of contacts;
(i) participants of a conversation;
(j) presence status of the participants of a conversation;
(k) a domain;
(l) groups of contacts;
(m) records of media that has been reviewed;
(n) groups of conversations;
(o) device nodes;
(p) lists of streams of media of conversations;
(q) streams of media; or
(r) any predefined data.

24. The method of claim 1, wherein maintaining the user data at the plurality of user data objects further comprises one of the following:
(a) maintaining the user data at the plurality of user data objects at a storage location;
(b) maintaining the user data at the plurality of user data objects on a computing device;
(c) maintaining the user data at the plurality of user data objects on a communication device;
(d) maintaining the user data at the plurality of user data objects in a database;
(e) any combination of (a) through (d).

25. The method of claim 1, wherein maintaining the user data at the plurality of user data objects further comprises maintaining the user data objects in one or more user data object tables.

26. The method of claim 25, further comprising assembling the source tree and the destination tree with source user data and destination user data maintained in one user data object table respectively.

27. The method of claim 25, further comprising assembling the source tree and the destination tree with source user data and destination user data maintained in two or more user data object tables respectively.

28. The method of claim 1, further comprising assembling different source trees and corresponding destination trees from the same user data maintained at the plurality of user data objects respectively.

29. A system for synchronizing user data, the system configured to:
maintain user data at a plurality of user data objects;
assemble a source tree, the source tree including a source root node and one or more dependent source nodes, the nodes of the source tree associated with source user data maintained at the plurality of user data objects;
assemble a destination tree, the destination tree including a destination root node and one or more dependent destination nodes, the nodes of the destination tree associated with destination user data maintained at the plurality of user data objects;
perform one or more checksum calculations for the nodes of the source tree and the destination tree based on the associated source user data and the associated destination user data maintained at the plurality of user data objects respectively; and
synchronize the destination tree and the destination user data with the source tree and source user data based on the comparison of the one or more checksum calculations of corresponding nodes in the source tree and the destination tree respectively by traversing the nodes of the source tree using an optimization algorithm to identify the nodes of the destination tree likely to be missing and/or have mismatching checksum values relative to the corresponding nodes of the source tree,
wherein missing nodes or nodes having mismatching checksums value(s) in the destination tree are added or modified to match the corresponding node or nodes in the source tree.

30. The system of claim 29, further configured to:
define a source view of the user data maintained at one or more of the plurality of user data objects; and
assemble the source tree, including the source root node and the one or more source dependent nodes, representative of the defined source view of the user data.

31. The system of claim 30, further configured to:
define a destination view of the user data maintained at one or more of the plurality of user data objects; and
assemble the destination tree, including the destination root node and the destination dependent nodes, representative of the defined destination view of the user data.

32. The system of claim 29 wherein the source tree and the destination tree are each assembled using the same algorithm.

33. The system of claim 29, wherein synchronizing the destination tree and the destination user data with the source tree and source user data based on the one or more comparisons of the checksum calculations of corresponding nodes in the source tree and the destination tree further comprises:
comparing checksum values for the source root node and the destination root node; and
assuming the source tree and the destination tree are synchronized if the checksums values for the source root node and the destination root node are the same.

34. The system of claim 29, wherein synchronizing the destination tree and the destination user data with the source tree and source user data based on the one or more comparisons of the checksum calculations of corresponding nodes in the source tree and the destination tree further comprises:
ascertaining when the checksum values for the source root node and the destination root node are different; and
traversing the source tree and the destination tree when the ascertained checksum values for the source root note and the destination root note are different by:
(iv) selecting a dependent node in the source tree;
(v) ascertaining if there is a corresponding node in the destination tree corresponding to the selected node in the source tree;
(vi) ascertaining if the corresponding node in the destination tree has a different checksum value than the selected node in the source tree;
(iv) copying the user data in the user data object associated with the selected source node into the user data object associated with the corresponding node in the destination tree if the checksum values are different;
(v) updating the checksum value of the corresponding node in the destination tree to match the selected node in the source tree;
(vi) updating and comparing the checksum values for the source root node and the destination root node after performing (i) through (v);
(vii) successively repeating (i) through (vi) until the checksum values of the source root node and the destination root node match; and
(viii) terminating the traversal of the source tree and the destination tree when the checksum values for the source root node and the destination root node match.

35. The system of claim 29, wherein synchronizing the destination tree and the destination user data with the source tree and source user data based on the one or more comparisons of the checksum calculations of corresponding nodes in the source tree and the destination tree further comprises:
ascertaining when the checksum values for the source root node and the destination root node are different; and
traversing the source tree and the destination tree when the ascertained checksum values for the source root note and the destination root note are different by:
(iii) selecting a dependent node in the source tree;
(iv) ascertaining if there is a corresponding node in the destination tree corresponding to the selected node in the source tree;
(iii) adding the corresponding node to the destination tree if there is no corresponding node in the destination tree;
(iv) associating a user data object with the corresponding node added to the destination tree;
(v) copying the user data in the user data object associated with the selected source node into the user data object associated with the added node in the destination tree;
(vi) updating the checksum value of the added corresponding node in the destination tree to match the selected node in the source tree;
(vii) updating and comparing the checksum values for the source root node and the destination root node after performing (i) through (vi); and
(viii) successively repeating (i) through (vii) until the checksum values of the source root node and the destination root node match; and
(ix) terminating the traversal of the source tree and the destination tree when the checksum values for the source root node and the destination root node match.

36. The system of claim 29, wherein synchronizing the destination tree and the destination user data with the source tree and source user data based on the one or more comparisons of the checksum calculations of corresponding nodes in the source tree and the destination tree further comprises:

ascertaining when the checksum values for the source root node and the destination root node are different;
traversing the source tree and the destination tree when the ascertained checksum values for the source root note and the destination root note are different by:
(iv) selecting a dependent node in the source tree;
(v) ascertaining if there is a corresponding node in the destination tree corresponding to the selected node in the source tree;
(vi) comparing the checksums values of the selected source node in the source tree and the corresponding node in the destination tree if there is a corresponding node in the destination tree; and
(iv) assuming the selected node in the source tree and the corresponding node in the destination tree are synchronized if the compared checksum values are the same.

37. The system of claim 36, wherein the system is further configured to assume that any source and destination nodes, dependent on the selected node in the source tree and the corresponding node in the destination tree having matching checksum values, are synchronized.

38. The system of claim 29, further configured to:
prioritize the user data maintained at the plurality of user data objects in a priority order; and
perform the synchronization of the nodes of the source tree and the destination tree in the priority order.

39. The system of claim 29, further configured to:
ascertain a select portion of the source tree and the destination tree; and
synchronize the differences between only the select portion of the source tree and the destination tree.

40. The system of claim 39, further configured to:
select a node in the source tree;
synchronize the node or nodes of the source tree and the destination tree at the selected node and above the selected node; and
not synchronize the node or nodes of the source tree and the destination tree below the selected node.

41. The system of claim 40, wherein the synchronization of the node or nodes of the source tree and the destination tree above the selected node further comprises:
copying the checksum value of the selected source tree node at the corresponding selected destination tree node; and
setting a flag indicating that the node or nodes below the selected nodes of the source and destination trees have not been synchronized.

42. The system of claim 29, further configured to:
ascertain if user data intended for synchronizing one or more destination user data objects is stale; and
not update the destination tree or accepting the stale user data at the one or more destination user data object for stale user data.

43. The system of claim 29, further configured to perform a second synchronization between the source tree and the destination tree, wherein during the second synchronization, the destination tree is the source tree and the destination tree is the source tree.

44. The system of claim 43, further configured to perform the synchronization and the second synchronization at the same time.

45. The system of claim 29, wherein performing the one or more checksum calculations for the nodes of the source tree and the destination tree further comprises computing user data checksum values for the source user data and the destination user data maintained at the plurality of user data objects associated with the nodes of the source tree and the destination tree respectively.

46. The system of claim 29, wherein each of the one or more nodes in the source tree and the destination tree is further characterized as one of the following:
(i) a parent node having one or more dependent nodes; or
(ii) a leaf node having no dependent nodes.

47. The system of claim 46, wherein performing the one or more checksum calculations for the nodes in the source tree and destination tree, including parent nodes and leaf nodes, further comprises calculating a node checksum value for each of the nodes in the source tree and destination tree respectively.

48. The system of claim 47 wherein calculating the node checksum value for each node characterized as a leaf node in the source tree and the destination tree further comprises:
identifying the user data objects associated with each of the leaf nodes in the source tree and the destination tree;
calculating the node checksum value using a checksum algorithm on the user data maintained at the identified user data objects associated with each of the leaf nodes in the source tree and the destination tree respectively.

49. The system of claim 47, wherein calculating the node checksum value for each node characterized as a parent node in the source tree and the destination tree further comprises:
identifying the user data objects associated with each of the parent nodes and the dependent nodes of the parent nodes in the source tree and the destination tree respectively; and
calculating the node checksum value for each of the parent nodes based on a combination of (i) a user data checksum value of the user data maintained at the user data objects associated with each of the parent nodes and (ii) the node checksum value of the dependent nodes of the parent nodes respectively.

50. The system of claim 49, wherein the combination of (i) and (ii) is based on a logical operation.

51. The system of claim 29, wherein the user data maintained at the plurality of user data objects comprises one or more of the following types of user data:
(a) voice media;
(b) video media;
(c) text media;
(d) sensor data;
(e) image media;
(f) the media of a conversation;
(g) a conversation list;
(h) a list of contacts;
(i) participants of a conversation;
(j) presence status of the participants of a conversation;
(k) a domain;
(l) groups of contacts;
(m) records of media that has been reviewed;
(n) groups of conversations;
(o) device nodes;
(p) lists of streams of media of conversations;
(q) streams of media; or
(r) any predefined data.

52. The system of claim 29, wherein maintaining the user data at the plurality of user data objects further comprises one of the following:
(a) maintaining the user data at the plurality of user data objects at a storage location;
(b) maintaining the user data at the plurality of user data objects on a computing device;
(c) maintaining the user data at the plurality of user data objects on a communication device;
(d) maintaining the user data at the plurality of user data objects in a database;
(e) any combination of (a) through (d).

53. The system of claim 29, wherein maintaining the user data at the plurality of data objects further comprises maintaining the user data objects in one or more user data object tables.

54. The system of claim 53, further configured to assemble the source tree and the destination tree with source user data and destination user data maintained in one user data object table respectively.

55. The system of claim 53, further configured to assemble the source tree and the destination tree with source user data and destination user data maintained in two or more user data object tables respectively.

56. The system of claim 29, further configured to assemble different source trees and corresponding destination trees from the same user data maintained at the plurality of user data objects respectively.

* * * * *